Figure 1:
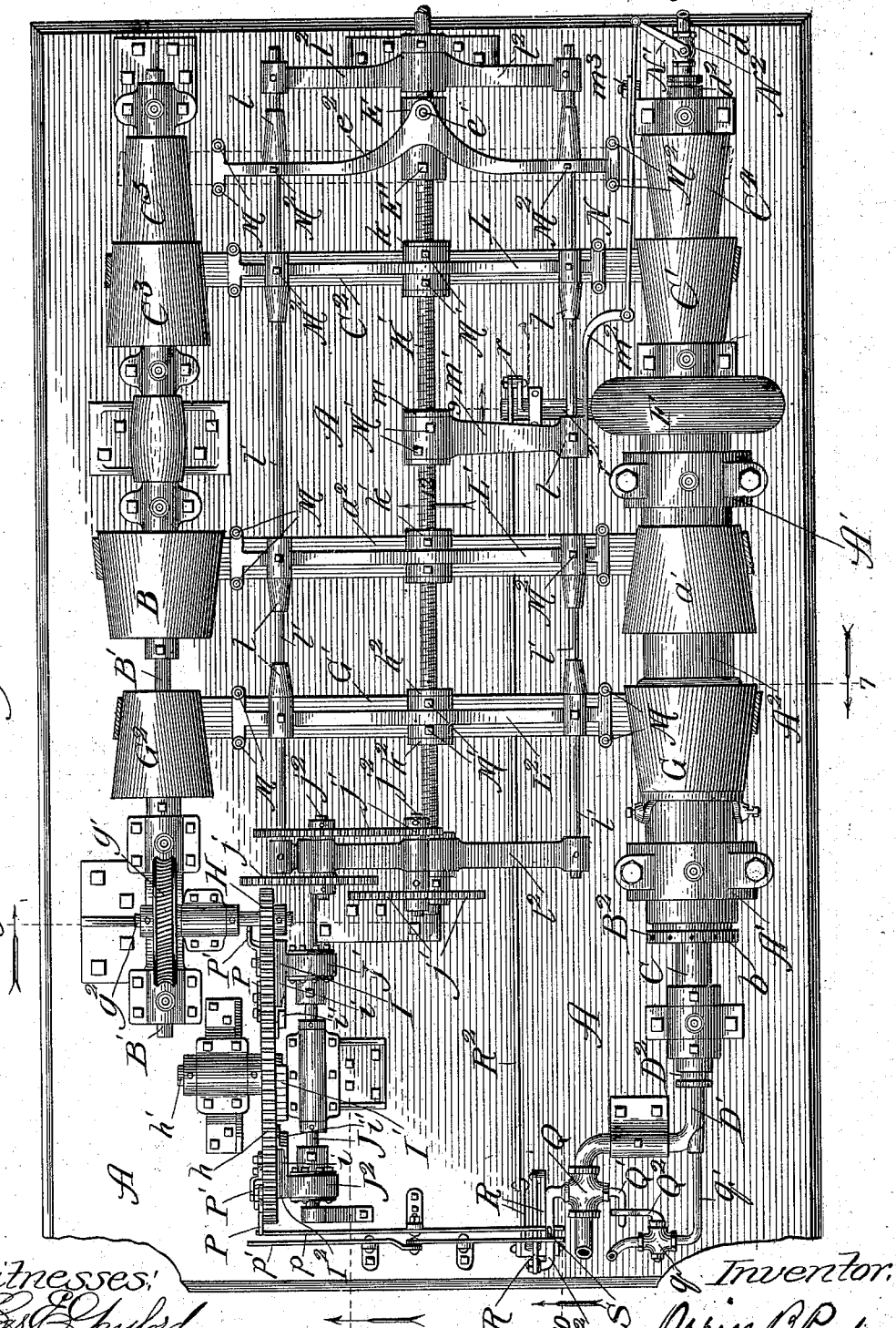

(No Model.)  4 Sheets—Sheet 1.

O. B. PECK.
CENTRIFUGAL SEPARATOR.

No. 560,620. Patented May 19, 1896.

Witnesses:
Chas. E. Gaylord,
R. H. Garman

Inventor:
Orrin B. Peck

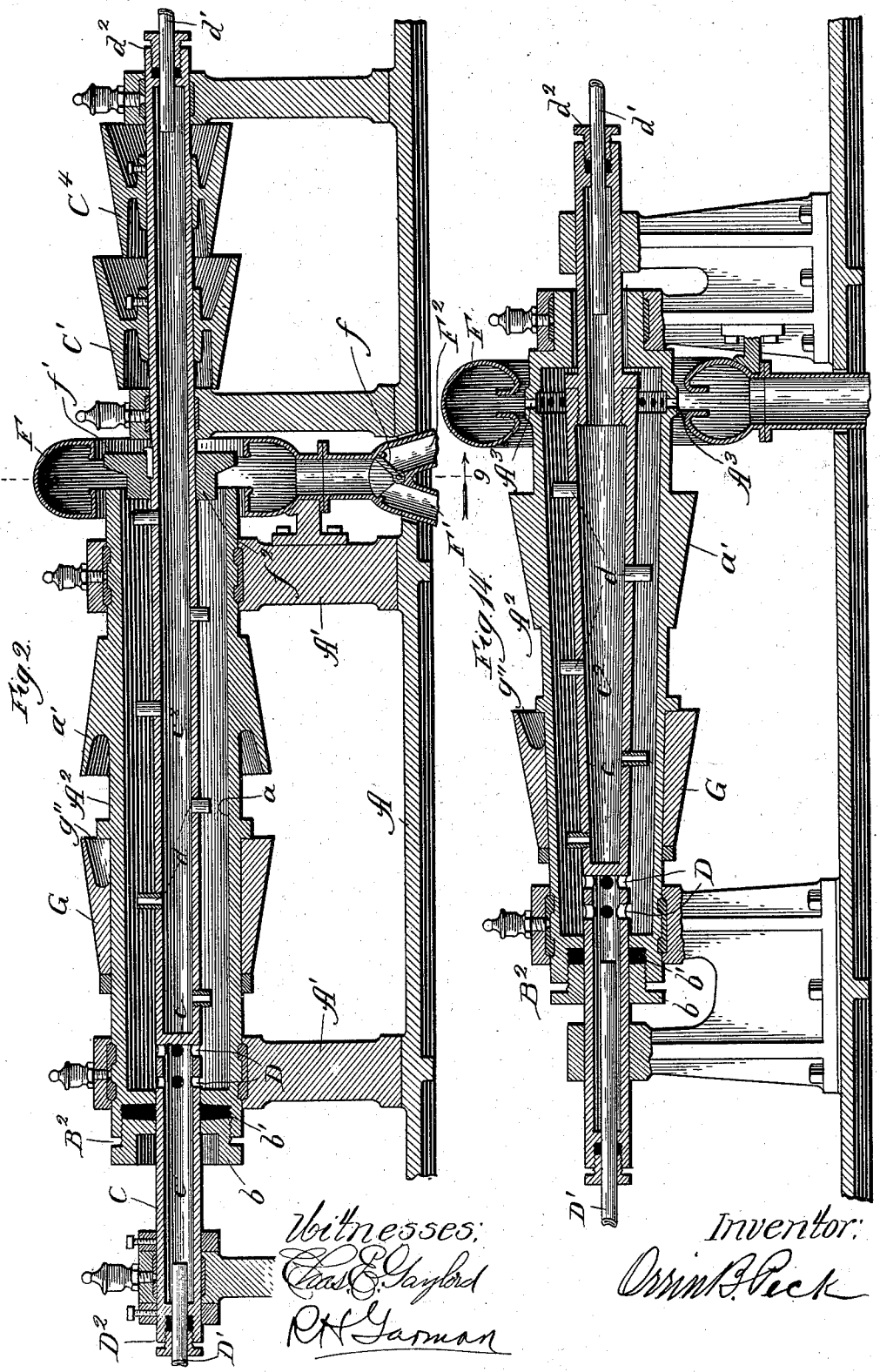

(No Model.) 4 Sheets—Sheet 3.
O. B. PECK.
CENTRIFUGAL SEPARATOR.
No. 560,620. Patented May 19, 1896.
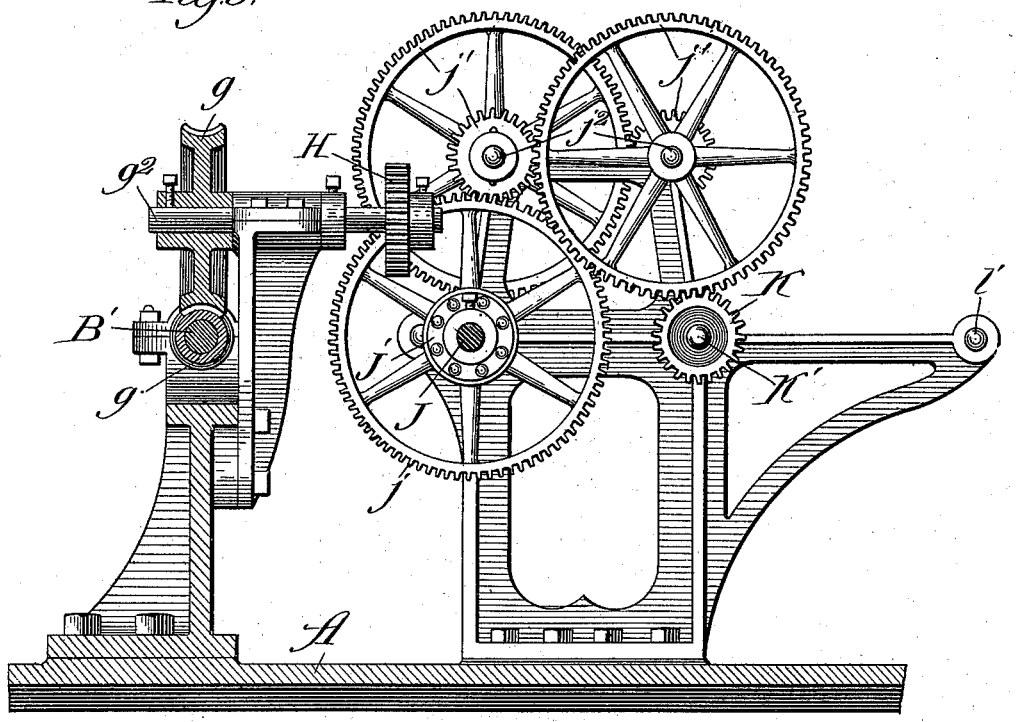
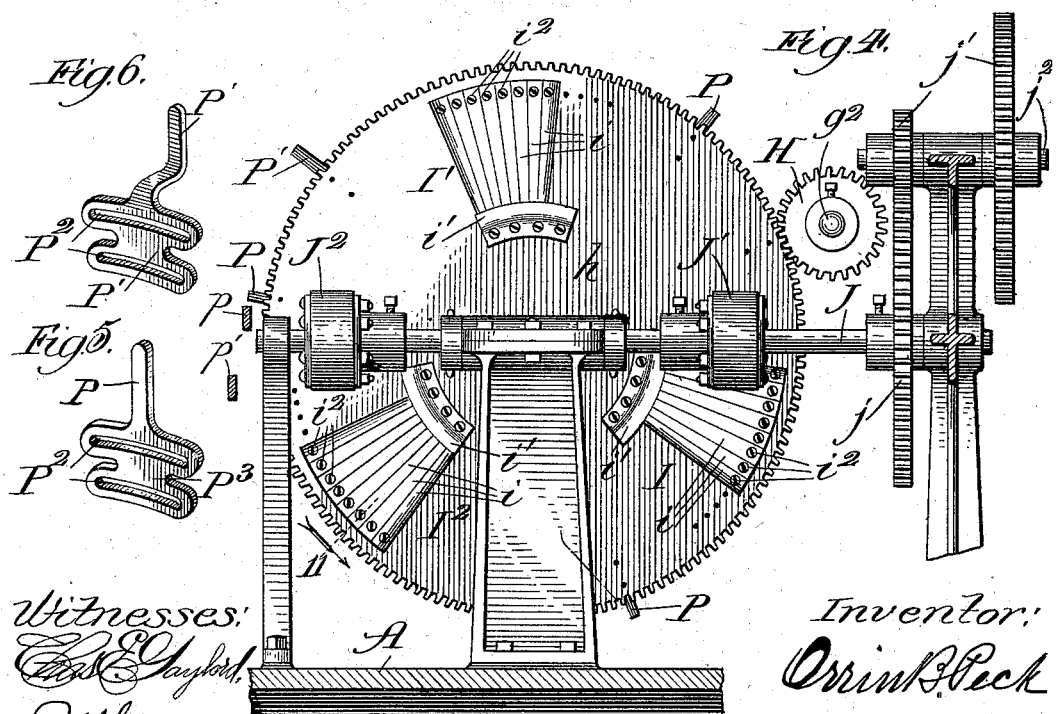

(No Model.) 4 Sheets—Sheet 4.
O. B. PECK.
CENTRIFUGAL SEPARATOR.
No. 560,620. Patented May 19, 1896.
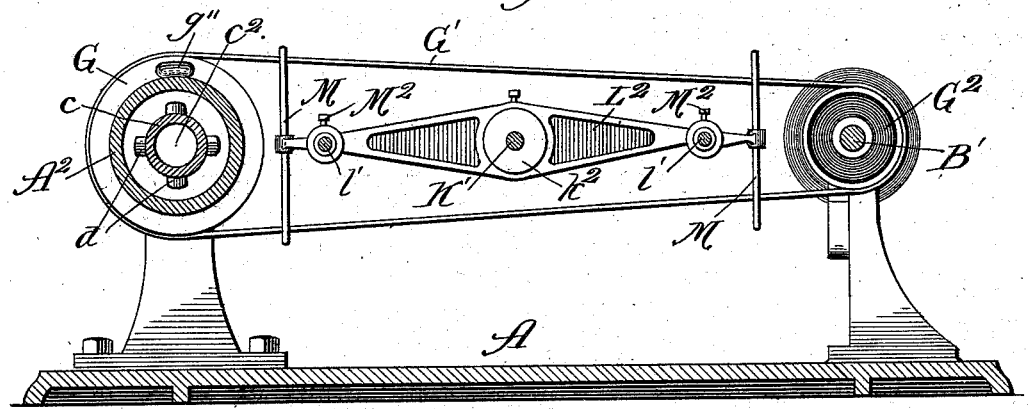
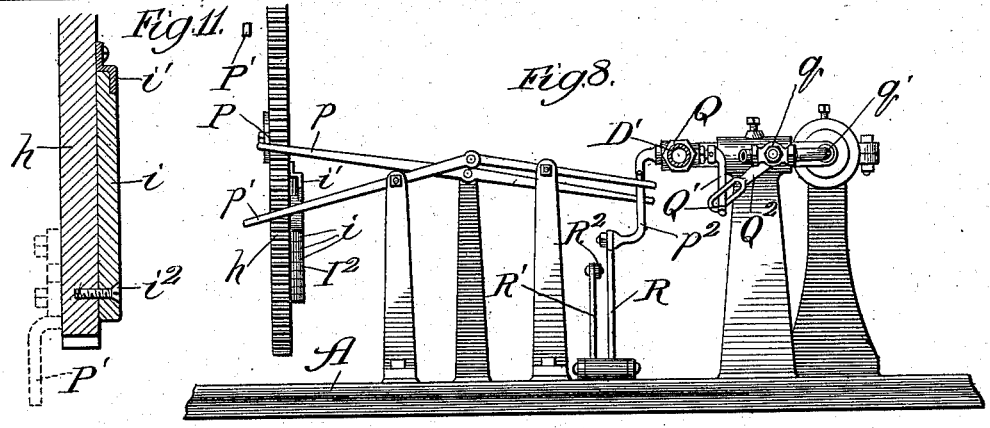
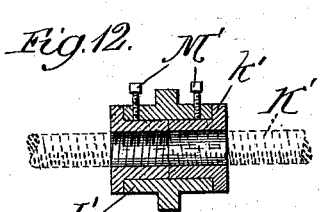
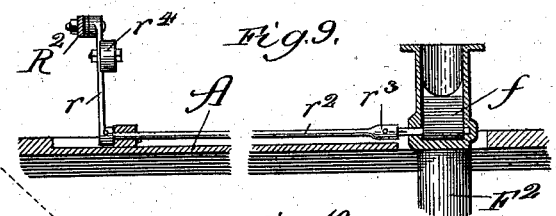
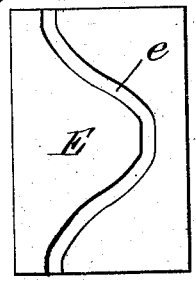
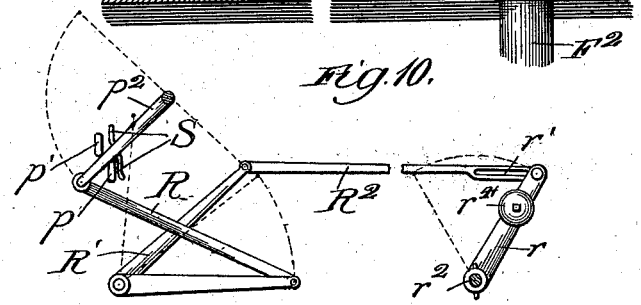
Witnesses:
Chas E Taylord
R H Garman
Inventor:
Orrin B Peck

UNITED STATES PATENT OFFICE.

ORRIN B. PECK, OF CHICAGO, ILLINOIS, ASSIGNOR TO MELINDA PECK, OF SAME PLACE.

CENTRIFUGAL SEPARATOR.

SPECIFICATION forming part of Letters Patent No. 560,620, dated May 19, 1896.

Application filed March 28, 1894. Serial No. 505,410. (No model.)

*To all whom it may concern:*

Be it known that I, ORRIN B. PECK, a citizen of the United States, residing at Chicago, in the county of Cook and State of Illinois, have invented a new and useful Improvement in Centrifugal Separators, of which the following is a specification.

My invention relates more particularly to improvements in centrifugal ore-separators; and the principal object of my improvement is to provide an apparatus for effecting a more perfect separation of materials of different degrees of specific gravity while in a finely-divided state, and their separate discharge by subjecting them to centrifugal force and agitation. I attain this object by the mechanism illustrated in the accompanying drawings, in which—

Figure 1 is a top plan view of the entire machine. Fig. 2 is a central vertical longitudinal section through the treatment vessel. Fig. 3 is a transverse section on the line 3 of Fig. 1. Fig. 4 is a longitudinal section on the line 4 of Fig. 1. Figs. 5 and 6 are perspective views of the striking-fingers P P'. Fig. 7 is a transverse section on the line 7 of Fig. 1. Fig. 8 shows an elevation of the mechanism for actuating the feed-valves. Fig. 9 is a transverse section on the line 9 of Fig. 2. Fig. 10 is a longitudinal section on the line 10 of Fig. 1, showing the mechanism for actuating the discharge-valve. Fig. 11 is a sectional detail on the line 11 of Fig. 4. Fig. 12 is a longitudinal sectional detail through the center of one of the belt-shifting bars. Fig. 13 shows a development of the cam-groove in the sleeve E, and Fig. 14 is a central vertical longitudinal section through the treatment vessel of another form of my improved machine. All sections are taken in the direction indicated by the arrows.

Similar letters refer to like parts throughout the several views of the drawings.

A designates a base-plate on which is supported, by standards A' A' in which it is journaled, the treatment vessel $A^2$, preferably of cylindrical form, and provided with an interior separating-surface $a$. This vessel has upon its exterior a conical belt surface or pulley $a$, by which it is rotated by a belt $a^2$ from the cone-pulley B on the counter-shaft B', preferably journaled in standards on the base-plate and driven from any suitable source of power.

The treatment vessel or separating-cylinder is preferably closed at the feed end by a packing or stuffing box $B^2$, through which passes an inner, preferably hollow, agitating cylinder or shaft C, journaled in standards on the base-plate, and rotated by either cone-pulley C', driven by a belt $C^2$ from the cone-pulley $C^3$ on the counter-shaft, or a smaller pulley $C^4$, belted to a pulley $C^5$, adjacent to $C^3$. The rotation of this agitating-cylinder is at a different rate of speed from the outer cylinder, preferably faster, causing the agitating means carried thereby to travel circumferentially with respect to the separating-surface. This cylinder forms with the separating-cylinder an intermediate channel or passage, and serves to deflect or guide the material under treatment along near the separating-surface. The stuffing-box $B^2$ is provided with a circular threaded gland or plug $b$, which may be screwed in toward the elastic packing $b'$, compressing it and thus insuring a practically water-tight joint.

The inner cylinder is divided by a partition $c$ into two sections $c'$ and $c^2$. The former is supplied with orifices D, through which material in a finely-divided state and mingled with a liquid, preferably water, introduced by a pipe or conduit D', passing through the stuffing-box $D^2$, similar to $B^2$, is fed to the treatment vessel at or near the end. Section $c^2$ is provided with orifices or perforations along over the separating-surface, in which are preferably screwed or otherwise secured hollow projections or tubes $d$. Through these pipes are forced jets of a liquid, preferably water, supplied by a pipe or conduit $d'$, passing through a stuffing-box $d^2$. These jets assist in agitating the material by their impact for the purpose of bringing and keeping lighter substances in suspension in the liquid or assisting in moving them toward the point of discharge, and later by their increased impact in dislodging the heavier for removal. The tubes also in their movement through the liquid and suspended material act by direct contact to mechanically agitate the lighter portion and maintain it in suspension, and also when their rate of travel is increased and also when their rate of travel is increased to aid in the discharge of heavier substances.

The treatment vessel discharges into a hood F, which communicates with branch pipes F' F², conducting lighter and heavier substances, respectively, to suitable receptacles, the passage from the hood to the pipes being controlled by a valve $f$, which is automatically operated as hereinafter described. Within the hood, keyed to the cylinder, is preferably placed a circular plate $f'$, which deflects the material discharged from the treatment vessel into the hood. This plate preferably has extending a short distance into the vessel a cylindrical portion $f^2$ of smaller diameter, which partially closes the exit therefrom, so that sufficient resistance is offered to the discharge of material and liquid to maintain the channel or passage practically full and keep the material on the separating-surface in a state of submergence, allowing the suspension of the lighter portion.

On the exterior of the treatment vessel, held between a fixed and a movable ring, is mounted the loose cone-pulley G, which is rotated by a belt G' from a pulley G² on the counter-shaft. This pulley is recessed on one side of its end of largest diameter, as shown at $g''$ in Figs. 2 and 7. This unequal distribution of weight serves to impart in its rotation a vibration to the treatment vessel, assisting in separating lighter from heavier material and, when its speed of rotation is increased, as hereinafter described, also aids in discharging the latter.

To accomplish the separation of material in the treatment vessel and the separate discharge of lighter and heavier substances in the particular form of mechanism described and illustrated, the speed of rotation of the separating-cylinder, agitating-cylinder, and vibrating pulley, the periods of introduction of material and liquid through pipe D' and agitating liquid through the pipe $d'$, and the operation of the discharge-valve are preferably automatically controlled and periodically or intermittently operated by the mechanism which will now be described. These actions might, however, be otherwise effected, manually, if desired.

On the counter-shaft B' is fixed a worm $g$, engaging a worm-wheel $g'$, mounted on a stub-shaft $g^2$, which also carries a small spur-gear H, engaging teeth upon the periphery of a large wheel $h$ on a stub-shaft $h'$, rotating it at a comparatively slow rate of speed. One face of the wheel $h$ serves as a friction surface or disk and carries three sets I I' I² of small movable friction-plates $i$, which are secured to the face of the gear at their inner ends by flanged brackets $i'$ and at their outer by screws $i^2$, engaging a series of holes. By changing the number and position of these plates the surface of frictional contact may be varied both in length and position. On shaft J, suitably journaled in a position parallel with the face of the wheel $h$, are mounted two friction wheels or rolls J' J², adjustably secured thereon by set-screws and alternately engaging with the friction-plates during the rotation of the wheel. On the end of shaft J is a gear $j$, which communicates through a train of speed-up gears $j'$ on the short longitudinal shafts $j^2$ with a gear K, mounted near the end of a longitudinally-extending threaded rod K'. This rod is supported for rotation in standards, preferably mounted on the base-plate, and carries along its length internally-threaded sleeves $k\ k'\ k^2$, upon which are mounted the transversely-extending belt-shifting bars L L' L², which are supported at their outer ends by sleeves $l$, sliding freely upon the rods $l'$, supported by the cross-bars $l^2$. Upon the ends of bars L L' L² are vertical pins M, engaging the opposite sides of the belts C² $a^2$ G', which communicate rotation to the treatment vessel, the inner cylinder, and the vibrating pulley, respectively.

As the wheel $h$ is rotated by the intermediate gearing the sets of friction-plates on its surface engage the friction-wheels J' J², and, through the speed-up gearing, cause the threaded rod to be rapidly rotated alternately in opposite directions with greater or less intermediate periods of rest, thus causing the belt-shifting bars to travel along the rod in accordance with this rotation and move the belts from one end of the cone-pulleys C', $a'$, and G to the other, increasing and decreasing the speed of rotation with intermediate periods of constant speed. These pulleys are so arranged on their respective cylinders that for an increase of speed of C' and G that of $a'$, which is tapered in the opposite direction, is decreased, for the reason hereinafter stated. The threaded sleeves $k\ k'\ k^2$ are preferably made in two parts, as shown in Fig. 12, and upon each of these bears a set-screw M', passing through the belt-shifting bar. If it be desired that any one of the belts shall remain stationary in its movement along the surface of its cone-pulley, maintaining the speed of rotation of one or more parts constant, while the others are varied, the set-screws are loosened, thus allowing the sleeves to turn freely in the bars and preventing their travel along the threaded rod. At the same time set-screws M² in the sleeves $l$ are tightened to engage the rods $l'$, thus insuring the belt-shifting bars remaining stationary.

At the right of the sleeve $k$, near the end of the rod K' and embracing it, is a sleeve E, secured to said rod by a set-screw E', to rotate therewith, and having upon its outer surface a cam-groove $e$, as shown in Fig. 13. This groove engages a downwardly-projecting pin $e'$ on a belt-shifting bar $e^2$, which is supported at its outer ends and supplied with vertical pins in the same manner as the bars just described, and as the sleeve rotates causes its comparatively rapid travel back and forth a number of times for each similar movement of the bars L L' L². When it is desired to effect more rapid changes in the speed of rotation of the agitating-cylinder relatively to the other rotating parts, the belt is removed from the pulley $C'$ and $C^3$ and another placed upon the pulleys $C^4$ and $C^5$, engaged by the bar $e^2$. When not in use, it is thrown out of action by loosening the screw $E'$ and tightening $M^2 M^2$. The rod $K'$ also carries another threaded sleeve $m$, upon which is mounted a bar $m'$, extending in one direction only and supported at its outer end by a sleeve $l$, similar to the others. To this bar is secured a rod $m^2$, to which is pivoted a connecting-rod N, pivotally connected at its opposite end to a lever $N'$ on the stem of the clear agitating liquid-valve $N^2$ in the pipe $d'$. The rod N is of adjustable length, being made in two parts secured together by a bolt $m^3$, passing through slots in their adjacent ends. The bar $m'$, being caused to travel back and forth by the rotation of the rod $K'$ within its threaded sleeve, causes the valve $N^2$ to be alternately opened and closed by the interposed rods and levers. It may be thrown out of action, if desired, by an arrangement precisely similar to that employed with the belt-shifting bars.

Upon the opposite surface of the wheel $h$ from that which carries the friction-plates are preferably three sets of two adjustable contact portions or fingers P P', which are secured to the face of the wheel by screws passing through slots $P^2$ in an enlarged portion $P^3$, the slots permitting an adjustment of the fingers circumferentially of the wheel. The finger P lies in the same plane as its enlarged portion and projects close to the face of the wheel, while the finger P' is bent twice nearly at right angles, which causes it to project in a plane at a slight distance from the surface. It has also a greater radial length. These fingers respectively engage the end of levers $p\ p'$, the former being a simple lever pivoted at its center upon a standard mounted on the base-plate, while the lever $p'$ is compound, its two sections being mounted upon two similar standards. The opposite ends of these levers contact with the lower and upper sides, respectively, of a lever $p^2$, extending at right angles from the end of the stem of the material-feeding valve Q in the pipe $D'$. The opposite extremity of the valve-stem carries a lever $Q'$, the lower end of which projects through a slot in the end of lever $Q^2$, fixed to the stem of the liquid-valve $q$ in the pipe $q'$, communicating with the pipe $D'$ at a point between the valve $q$ and the treatment vessel.

To the outer extremity of the lever $p^2$ is pivoted a rod R, connected to one member of a bell-crank lever $R'$, pivoted to the base-plate, to the other arm of which is pivotally attached a long connecting-rod $R^2$, leading to the upper extremity of a lever $r$, to which it is attached by a bolt passing through a slot $r'$. The lower end of the lever $r$ is secured to a rod $r^2$, having a socket $r^3$ at it its opposite end in which is secured by means of a set-screw the stem of the discharge-valve $f$. By changing the point of attachment of the lever $r$ to the rod $R^2$ and by turning the valve-stem in its socket, the extent of movement of the valve $f$ may be adjusted and its relative time of action to the other elements varied. A weight $r^4$, near the upper end of the lever $r$, assists in throwing it in one direction or the other.

As the levers $p\ p'$ are moved downward by the contact of the fingers P P', they respectively raise and lower the lever $p^2$, thus opening and closing the valve Q, with intermediate periods during which it is stationary. The lever $p^2$ carries upon its upper and lower surfaces small pins S, which serve to prevent the slippage of the levers $p\ p'$ as they engage it. As the valve Q is actuated, it also in turn opens and closes the liquid-valve $q$ through the intervention of the levers $Q'\ Q^2$. At the same time the discharge-valve $f$ is operated by the bell-crank and its connecting rods and levers.

The pipes $D'$, $d'$, and $q'$ are preferably connected to elevated reservoirs, pumps, or other sources of supply for securing a suitable pressure of material and liquid to obtain the proper impellent forces of liquid through the cylinder and impact force from the pipes or tubes $d$. Manually-operated valves might be arranged between these sources and the separator to govern the pressure irrespective of the position of the automatic valves.

The operation of the device is as follows: The valve Q being opened to its fullest extent ore in a finely-divided state and mingled with a liquid, preferably water, is fed into the treatment vessel, which is being rotated at a speed sufficient to develop the desired degree of centrifugal force in sufficient quantities to fill the channel or passage between the inner cylinder and the separating-surface. Here the centrifugal force causes the material to move toward a position around the circumference of the vessel and the heavier to lodge upon the separating-surface. The material in suspension in the liquid within the channel and the surface of the accumulated material is also subjected to opposing forces of, preferably, approximately constant degree in the form of the agitating force of the liquid-jets, the valve $N^2$ being partially open to the mechanical agitation produced by the movement of the tubes through the liquid and to the vibration of the separating-surface resulting from the rotation of the recessed pulley. The lighter material is thereby maintained in suspension in the liquid flowing through the treatment vessel and is carried along and discharged into the pipe $F'$, which conveys it to a suitable receptacle.

It will not be found necessary, however, at all times to employ all of the above-mentioned opposing forces, as they may be used separately or conjointly, and of greater or less degree, as may be best adapted to the particular conditions or material under consideration. It is evident that the more violent the agitation with relation to the centrifugal force developed during the separating period the heavier will be material discharged during such period, and vice versa. The separation being accomplished, the valves and gearing are in the position shown in the drawings, and heavier material is now to be automatically discharged. The group I of friction-plates in its upward movement, as shown in Fig. 4, engages the friction-wheel J' and causes it to rotate, through the intermediate gearing, the longitudinal threaded rod, thus moving the threaded sleeves and the bars that they support, shifting the belts to the opposite ends of the cone-pulleys, and opening wide the valve $N^2$. At the same time the finger P strikes the end of lever $p$, which, by means of the system of levers already described, closes the material-valve Q, opens the clear-liquid valve $q'$, and shifts the position of the discharge-valve. As a result of these changes the supply of material is shut off from the treatment vessel, the speed of rotation of said vessel is decreased, causing the heavier substances to be held less forcibly against the separating-surface, and permitting them to be dislodged by the increased agitation and increased vibration. At the same time the impellent force of the liquid is so intensified by the maximum supply through the pipes $q'$ $d'$ that the heavier substances are washed from the separating-surface out of the treatment vessel and discharged into the pipe $F^2$, which conveys them to a separate receptacle. Though the feed of material is preferably stopped during the discharge of the concentrates to prevent the lowering of their grade by the gangue introduced, this is not necessarily done under all conditions, since the discharge period is usually comparatively short. This position of parts and constant degree of forces for discharge are maintained until the group I' of friction-plates in its downward movement engages the friction-roll $J^2$, causing the opposite rotation of the rod K', which, with the striking of the finger P' against the lever $p'$, restores the elements to their former condition and the period of separation follows.

When a separating vessel or cylinder is used of sufficiently large diameter to permit an accumulation or head of liquid at the receiving end to secure by the centrifugal force generated therein the desired force of flow through the vessel the packing-boxes are preferably dispensed with. By means of adjustments and changes in the various parts of the mechanism the length and frequency of the periods of operation of the elements, the intensity of the applied forces, and their relation one to the other may be varied within the desired limits.

The relative length of the periods during which the material and liquid are fed may be controlled by the circumferential movement of the fingers on the face of the disk, while the time and extent of movement of the discharge-valve may be independently adjusted by the point at which its lever is attached to the connecting-rod and the movement of its valve-stem in the connecting-socket.

The adjustment of the contact-surfaces I I' $I^2$ and the friction-wheels engaging therewith furnish a means for varying the intensity and time of application of the centrifugal force, agitation, and vibration, collectively, to vary the periods of separation and removal. If, for example, it is desired to gradually change the speed of rotation of the separating-surface, agitating-cylinder, and vibrating pulley during the period of separation, and then almost immediately decrease them to the initial point during the period of removal of heavier substances, the contact-surfaces may be sufficiently increased by adding the removable plates and the friction-wheels moved well in toward the center of the wheel $h$. As a result one of the wheels will be in frictional engagement with the contact-surfaces a greater part of the time, actuating the belt-shifters almost continuously, alternately in opposite directions, effecting the required change; or, if it is desired to maintain the speed of rotation of these parts approximately constant during the periods of separation and removal but of different rates, plates are removed from each of the contact-surfaces and the friction-rolls moved toward the periphery of the wheel, giving substantially the arrangement illustrated in the drawings, when the wheels will be alternately engaged and oppositely rotated with intermediate periods of rest, thus shifting the belt to one end of the actuating cone-pulley and rotating the parts at a constant rate for separation, and then to the other end thereof, varying the speed to required amount for discharge and maintaining them there until the cycle of operations recommences.

By setting any one of the belt-shifting bars along the threaded rod the timing of the movements of the parts it actuates will be changed with respect to its fellows. The rotation of any one pulley may be maintained constant by throwing out of action and fixing its belt-shifting bar, or any one of the pairs of pulleys may be removed and others substituted, or the pulleys reversed in position on the shaft, thus making the change in its speed of rotation opposite to the others.

The speed of rotation of the agitating-cylinder may be changed relatively to that of the separating-cylinder by driving it through the pulleys $C^4 C^5$ instead of $C' C^3$, and by substituting a cam having a different form of groove from that of E the relation between the periodic changes of speed of the two cylinders may be further varied. The setting of the bar $m'$ on the rod K' and the variation in the length of the rod N adjust the periods of action of the valve $N^2$.

In the form illustrated in Fig. 14, Sheet 2, the separating vessel $A^2$ instead of being of cylindrical form is conical, the diameter increasing toward the discharge end, and its driving-pulley $a'$ is inclined in the opposite direction from that in the form of machine shown in Fig. 2. Therefore its speed of rotation, and consequently the centrifugal force developed, is increased to assist in effecting the removal of heavier substances, the component of the force in a direction parallel to the separating-surface being sufficient to assist in carrying them toward the discharge end. The agitating-cylinder $c$ is also preferably of conical form to maintain the tubes $d$ at a uniform distance from the separating-surface throughout the entire length. This agitating-cylinder is non-rotatably mounted in its supporting-standards, the increase of agitation for discharge being obtained by the increased degree of rotation of the separating-cylinder which carries the liquid and suspended material more rapidly by the tubes $d$. In this form both ends of the separating vessel are closed, and the material is discharged through orifices $A^3$ in the periphery. The mechanism for automatically actuating the feed and discharge valves and varying the speeds of rotation already described in connection with the other figures might be likewise employed here, and has therefore not been illustrated.

It is not essential in these machines that the agitating means be mounted upon a cylinder or other body which forms a channel or passage with the separating-surface, but may be arranged in any desired manner. In any case a sufficient amount of liquid would be introduced to effect the submergence of the material.

Although the term "cylindrical" has been applied throughout to the separating vessel and the agitating-shaft, this form is not absolutely essential to the operation of the machine, and any other might be employed by which the desired result would be obtained. It is to be understood that the word is used in this generic sense in both description and claims.

It will be seen that when the term "periodically" is applied to the intervals during which separation and the discharge of heavier substances occur, to the times of supplying material and liquid and applying the separating forces, it is not necessarily used in the sense of equal but of varying or intermittent periods.

It will be noticed that while the aqueous and other forces opposing centrifugal force permit or allow the precipitation of heavier substances, they cause or effect—that is, compel—the suspension of the lighter in the liquid, whereas the centrifugal force acts positively to effect both results. This explanation is made because it was not always possible to bring out the distinction clearly in the claims without undue prolixity when mentioning these forces in connection.

It is obvious that many changes and modifications in the details of construction of the various parts of the mechanism herein described may be made, as desired by the constructor or to best suit the varied conditions under which the machine is operated, without departing from my invention.

In my applications, Serial Nos. 505,413 and 505,418, filed March 28, 1894, I claim certain features shown and described, but not claimed herein.

What I claim as my invention, and desire to secure by Letters Patent, is—

1. In a centrifugal separator, the combination of a rotatable separating-surface upon which the material is in a submerged state, a rotatable agitator in proximity thereto, and automatic means for decreasing the speed of rotation of the separating-surface and increasing that of the agitator whereby the heavier substances may be removed, substantially as described.

2. In a centrifugal separator, the combination of a rotatable separating-surface upon which material is in a submerged state, a rotatable agitator in proximity thereto, conduits for supplying material and a liquid to the separator, and means for increasing the speed of rotation of the agitator whereby the heavier substances may be removed, substantially as described.

3. In a centrifugal separator, the combination of a rotatable separating-surface upon which the material is in a submerged state, a rotatable agitator in proximity thereto, conduits for supplying material and a liquid to the separator, and means for increasing the speed of rotation of the agitator and flow of liquid whereby the heavier substances may be removed, and simultaneously stopping the feed of material, substantially as described.

4. In a centrifugal separator, the combination of a rotatable separating-surface upon which the material is in a submerged state, a rotatable agitator in proximity thereto, conduits for supplying material and a liquid to the separator, and means for increasing the speed of rotation of the agitator and the flow of liquid whereby the heavier substances may be removed, substantially as described.

5. In a centrifugal separator, the combination of a rotatable separating-surface upon which the material is in a submerged state, a rotatable agitator in proximity thereto, conduits for supplying material and a liquid to the separator, and automatic means for increasing the speed of rotation of the agitator whereby the heavier substances may be removed, and simultaneously stopping the feed of material, substantially as described.

6. In a centrifugal separator, the combination of a rotatable separating-surface upon which the material is in a submerged state, a rotatable agitator in proximity thereto, conduits for supplying material and a liquid to the separator, and automatic means for increasing the speed of rotation of the agitator whereby the heavier substances may be removed, substantially as described.

7. In a centrifugal separator, the combination of a rotatable treatment vessel and rotatable separating mechanism therein, means for varying the speed of rotation, and friction-rolls connected thereto by intermediate gearing and actuated by revolving friction-surfaces to accomplish this variation, substantially as described.

8. In a centrifugal separator, the combination of a rotatable treatment vessel and rotatable separating mechanism therein, means for varying the speed of rotation, and friction-rolls connected thereto and actuated by revolving friction-surfaces to accomplish this variation, each surface being composed of movable portions whereby its extent and position may be changed, substantially as described.

9. In a centrifugal separator, the combination of a rotatable vessel, means for supplying material and liquid thereto, valves for regulating the flow thereof, and a rotating wheel having projecting portions contacting intermittently therewith for actuating such means, substantially as described.

10. In a centrifugal separator, the combination of a rotatable vessel, means for producing agitation in said vessel, means for supplying material and liquid thereto, means for regulating the flow thereof, and revolving contact portions for actuating such means, substantially as described.

11. In a centrifugal separator, the combination of a rotatable treatment vessel, means for varying the speed of rotation, and friction-rolls connected thereto by intermediate gearing and actuated by revolving friction-surfaces to accomplish this variation, substantially as described.

12. In a centrifugal separator, the combination of a rotatable treatment vessel, belts passing over cone-pulleys for rotating the parts of the same, belt-shifters actuated by a rotatable rod for changing the position of the belts on the pulleys, friction-rolls geared thereto and alternately rotated in opposite directions by revolving friction-surfaces, substantially as described.

13. In a centrifugal separator, the combination of a rotatable vessel, means for supplying material and liquid thereto, valves for regulating the flow thereof, and adjustable revolving contact portions for actuating such means, substantially as described.

14. In a centrifugal separator, the combination of a rotatable vessel, pipes for supplying material and liquid thereto, valves for regulating such supply, and levers for actuating said valves operated by revolving contact portions adjustably mounted upon a rotating wheel, substantially as described.

15. In a centrifugal separator, the combination of a rotatable treatment vessel, belts passing over cone-pulleys for rotating the parts of the same, belt-shifters actuated by a rotatable rod for changing the position of the belts on the pulleys, said belt-shifters being independently adjustable on the rod, and friction-rolls geared thereto and alternately rotated in opposite directions by revolving friction-surfaces, substantially as described.

16. In a centrifugal separator, the combination of a rotatable treatment vessel, and rotatable separating mechanism therein, means for varying the speed of rotation, friction-rolls connected thereto by intermediate gearing and actuated by revolving friction-surfaces to accomplish this variation, the rolls being adjustable toward and from the axis of revolution, substantially as described.

17. In a centrifugal separator, the combination of a rotatable treatment vessel and rotatable separating mechanism therein, reciprocating means for varying the speed of rotation of each by shifting belts on cone-pulleys, and means for independently adjusting the relative position of each of the belt-shifters, substantially as described.

18. In a centrifugal separator the combination of a rotatable treatment vessel, means for periodically effecting the removal of accumulated heavier substances, and automatic means for diverting such substances into a separate passage from that which received the lighter, substantially as described.

19. In a centrifugal separator, the combination of a rotatable treatment vessel, means for periodically effecting the removal of accumulated heavier substances, an automatically-movable valve for diverting such substances into a separate passage from that which received the lighter, and means for adjusting the time of operation of said valve, substantially as described.

ORRIN B. PECK.

Witnesses:
M. L. ALLEN,
R. H. GARMAN.